(12) United States Patent
Chopde et al.

(10) Patent No.: US 11,960,572 B2
(45) Date of Patent: Apr. 16, 2024

(54) SYSTEM AND METHOD FOR IDENTIFYING OBJECT INFORMATION IN IMAGE OR VIDEO DATA

(71) Applicant: Fractal Analytics Private Limited, Mumbai (IN)

(72) Inventors: Abhishek Punjaji Chopde, Buldana (IN); Vanapalli Prakash, Visakhapatnam (IN); Samreen Bano Faishal Khan, Mumbai (IN); Praneeth Chandra Bogineni, Vijayawada (IN)

(73) Assignee: Fractal Analytics Private Limited, Mumbai (IN)

( * ) Notice: Subject to any disclaimer, the term of this patent is extended or adjusted under 35 U.S.C. 154(b) by 561 days.

(21) Appl. No.: 17/155,369

(22) Filed: Jan. 22, 2021

(65) Prior Publication Data
US 2022/0188577 A1 Jun. 16, 2022

(30) Foreign Application Priority Data
Dec. 16, 2020 (IN) .............................. 202021054799

(51) Int. Cl.
*G06N 3/0475* (2023.01)
*G06F 18/21* (2023.01)
(Continued)

(52) U.S. Cl.
CPC ...... *G06F 18/2185* (2023.01); *G06F 18/2155* (2023.01); *G06F 18/40* (2023.01);
(Continued)

(58) Field of Classification Search
CPC .... G06V 10/82; G06V 10/764; G06V 10/454; G06V 20/20; G06V 40/172; G06V 20/698; G06V 20/70; G06V 10/46; G06V 10/462; G06V 30/19173; G06V 2201/07; G06V 2201/09; G06V 40/197; G06V 10/811; G06V 10/809; G06V 30/413; G06V 30/36; G06V 10/7753; G06V 10/774; G06V 10/40; G06V 10/44; G06V 10/7788; G06V 10/464; G06V 10/467; G06V 10/771; G06V 10/77; G06V 10/7715; G06V 20/47; G06V 20/46; G06V 2201/08; G06V 40/193;
(Continued)

(56) References Cited

U.S. PATENT DOCUMENTS

| 10,387,996 B2 | 8/2019 | Cohen et al. | |
| 2016/0275375 A1* | 9/2016 | Kant | ...................... G06V 20/586 |
| 2021/0319266 A1* | 10/2021 | Chen | ...................... G06V 10/764 |

* cited by examiner

*Primary Examiner* — Matthew C Bella
*Assistant Examiner* — Dennis Rosario
(74) *Attorney, Agent, or Firm* — Wiley Rein LLP

(57) ABSTRACT

Systems and methods are provided for identifying a product in an image and outputting stock keeping units of the product. The system comprises three main components: a database server, a data analytics system and a standard dashboard. The database server contains real-time inventory images as well as historical images of each product type. The data analytics system is executed by a computer processor configured to apply a multi-head self-supervised learning-based classifier to detect product information captured by the image. The data analytics system is also configured to determine hierarchical classification categories for the product. The standard dashboard is configured to output a report regarding the product information.

22 Claims, 8 Drawing Sheets

(51) Int. Cl.
*G06F 18/214* (2023.01)
*G06F 18/40* (2023.01)
*G06N 3/02* (2006.01)
*G06N 3/0455* (2023.01)
*G06N 3/0464* (2023.01)
*G06Q 10/087* (2023.01)
*G06V 10/774* (2022.01)

(52) U.S. Cl.
CPC .............. *G06N 3/02* (2013.01); *G06N 3/0455* (2023.01); *G06N 3/0464* (2023.01); *G06N 3/0475* (2023.01); *G06Q 10/087* (2013.01); *G06V 10/7753* (2022.01); *G06V 2201/09* (2022.01)

(58) Field of Classification Search
CPC ........ G06V 10/42; G06V 10/62; G06V 10/70; G06V 10/806; G06N 3/08; G06N 20/00; G06N 3/0464; G06N 3/02; G06N 3/09; G06N 3/088; G06N 3/0455; G06N 3/094; G06N 3/0475; G06N 3/042; G06N 3/0895; G06N 3/045; G06N 20/20; G06N 3/049; G06N 3/0499; G06N 3/0495; G06N 3/044; G06T 2207/20081; G06T 2207/20084; G06T 2207/30128; G06T 9/002; G06T 9/00; G06T 7/246; G06T 7/33; G06T 9/007; G06F 18/24; G06F 30/27; G06F 40/169; G06F 16/355; G06F 16/35; G06F 18/254; G06F 16/55; G06F 16/906; G06F 2218/12; G06F 18/21; G06F 18/2413; G06Q 10/087; G06Q 10/0875; G06Q 20/203; G06Q 30/0185; G06Q 30/0643; G06Q 50/28; G06Q 30/0641; G06Q 30/0282; G06Q 10/08
See application file for complete search history.

SYSTEM AND METHOD FOR IDENTIFYING OBJECT INFORMATION IN IMAGE OR VIDEO DATA

RELATED APPLICATIONS

This application claims priority benefit of Indian Patent Application No. 202021054799, filed Dec. 16, 2020, which are incorporated entirely by reference herein for all purposes.

FIELD

The present disclosure relates generally to image processing, and more specifically to systems and methods of identifying objection information in image or video data.

BACKGROUND ART

One of the biggest investments for the marketing organization of a Consumer Packaged Goods (CPG) company is retail audits to ensure that the product is positioned in the way that makes it most appealing to the consumer, the product is consistently displayed to maximize sales, and availability of the products to prevent out-of-stock.

Traditionally, the retail audits are conducted manually, which is time-consuming and costly. Artificial intelligent (AI) technology provides the potential for significant improvements in audit speed and quality. With large number of data sets comprising thousands of shelf images, companies can now leverage of AI to better monitor their retail shelf presence. AI will help in recognizing product conditions on shelf such as availability, assortments, space, pricing, promotions and many more. It will empower companies to take immediate corrective. AI algorithms can definitely improve planogram compliance by providing accurate stock visibility insights. Companies will be able to monitor and benchmark duration of out of stock instances, which will lead to better in-store product placement. See U.S. patent Ser. No. 10/387,996.

However, current solutions for brand recognition have various limitations. One constraint is time and cost to train a system to recognize new brands, new sub-brands or new logos of the same brand due in part to the frequent changes in product packaging. A classifier trained with images of the old package often cannot achieve the same performance with images from the newer package. As such, the classifier must be either retrained, or must possess an ability to adapt to a new brand or logo without, or with only a few, training examples from the new brand or logo.

Therefore, there is still a need for an improved AI technology platform and computer network implemented method to analyze image or video data to achieve high robustness and accuracy of detection.

SUMMARY OF THE INVENTION

The instant disclosure describes various techniques that overcome the above noted limitations of prior art techniques through the use of a multi-head self-supervised learning neural network-based classifier techniques applied to images obtained by one or more image capture devices.

The present invention provides a method and system to automatically analyze image or video data to identify all the products caught by the image or video and output product attributes. The present invention devises a machine learning algorithm to detect stock keeping units (SKUs) of the products and associated statistics and key performance indicator (KPI).

An aspect of the present invention is a system for identifying a product in an image and outputting stock keeping units of the product, such as brand/type, manufacturer, description, material, size, color, packaging and warranty terms. The system comprises three main components: a database server, a data analytics system and a standard dashboard. The cloud database contains real-time inventory images as well as historical images of each product type. The data analytics system is executed by a computer processor configured to apply object detection and classification and deep learning algorithms to detect product information captured by the image. The data analytics system is also configured to determine hierarchical classification categories for the product. The standard dashboard is configured to output a report regarding the product information.

The present invention provides a multi-head self-supervised learning-based classifier that consists of two main parts: a single base convolutional encoder that is pre-trained using contrastive loss to extracts features over the whole input image, and multiple projection heads layers to map the features to the space where contrastive loss is applied. The single base encoder is trained using a self-supervised learning technique and is common for all classification tasks. Different projection heads may be used to perform brands/types and sub-brands/sub-types level classification. To perform various sub-brands/sub-types classification, only the head corresponding to their base brand/type may need to be replaced.

In some embodiments, an encoder neural network is pre-trained to extract global image representations that are useful for downstream tasks, including objection classification, and constitutes a good initialization that can be fine-tuned into an accurate model. Contrastive learning enforces representations to be similar for similar pairs and dissimilar for dissimilar paris. After training, the encoder weights are frozen so that they are constant. Subsequently, for each brand/type and sub brand/type level classification, a projection head network is attached to the encoder output and is trained on labelled images. Multiple heads are attached to the encoder and trained for that specific task. Each projection head would not communicate with each other.

The encoder network may be various choices of the network architecture without any constraints. In some embodiments, the encoder network may be ResNet, AlexNet, VGGNet, or Inception network as the backbone. The projection head may be a multilayer perceptron (MLP). As the contrastive loss, normalized temperature-scaled cross-entropy loss (NT-Xent) may be applied.

In some embodiments, this invention provides a data augmentation module that transforms any given data randomly resulting in two correlated views of the same example, which are considered as a positive pair. The augmentation module may comprise cropping and resizing, rotation and cutout, color distortions, Gaussian blur, and Sobel filtering.

Having one encoder for multiple projection heads would keep the weight file size almost constant even with growing heads. As each projection head would have a smaller number of parameters and is very easily replaceable, the system will be much more memory and time efficient. Training and deployment time of the system would be reduced by 100%. Further, the system is very cost-effective as there is no human-annotation involved. The accuracies of the system are more stable over a period of time and false positive is reduced by 4×.

One embodiment may provide a system for identifying a product in an image and outputting an identifier of a target, comprising:

a database server executed by one or more storage devices for storing image data comprising real-time inventory images and historical images of each product type;

a data analytics system comprising one or more convolutional neural networks; and a standard dashboard;

wherein the data analytics system comprises a non-transitory computer-readable medium and instructions that when executed by the non-transitory computer-readable medium cause the non-transitory computer-readable medium to perform operations comprising:

receiving an input unlabeled image, via application programming interface from a recording device or an external database;

generating, via an augmentation module of the data analytics system, an augmented unlabeled image;

training an encoder neural network of the data analytics system with the augmented unlabeled image to extracts features and generate an output labeled image;

training a plurality of projection heads with the output labeled image to map features to a space where contrastive loss is applied and perform types and sub-types level classification; and generating a descriptor of the object based on the types and sub-types level classification;

and wherein the standard dashboard is configured to output the descriptor of the object.

An additional embodiment herein provides a method for identifying a product in an image and outputting an identifier of a target, comprising receiving an input unlabeled image, via application programming interface from a recording device or an external database;

generating, via an augmentation module of the data analytics system, an augmented unlabeled image;

training an encoder neural network of the data analytics system with the augmented unlabeled image to extracts features and generate an output labeled image;

training a plurality of projection heads with the output labeled image to map features to a space where contrastive loss is applied and perform types and sub-types level classification; and generating a descriptor of the object based on the types and sub-types level classification; and outputting the descriptor of the object, via a standard dashboard.

An additional embodiment herein provides a method for identifying a product in an image and outputting an identifier of a target, wherein the method is executed by a non-transitory computer-readable medium, the method further comprising logging in a mobile application by a user on the mobile device using a user credential;

selecting a store location in a map view on the application;

selecting a shelf;

initiating an unload of an image of the selected shelf;

transmitting the image of the selected shelf captured by a remote camera;

receiving the image of the selected shelf at the user mobile device;

validating the image of the selected shelf by the user;

manually annotating the image of the selected shelf;

training the encoder neural network of the data analytics system with the annotated image to extracts features and generate an output labeled image;

training the projection heads with the output labeled image to map features to a space where contrastive loss is applied and perform types and sub-types level classification; and generating a descriptor of the object based on the types and sub-types level classification; and outputting the descriptor of the object, via a standard dashboard;

wherein the encoder neural network and the projection heads are periodically updated using continuous integration and continuous delivery (CI-CD) capability of an Intelligent Video Analytics (IVA) platform.

BRIEF DESCRIPTION OF THE DRAWINGS

The invention will be described in more detail below on the basis of one or more drawings, which illustrates exemplary embodiments.

DETAILED DESCRIPTION OF THE EMBODIMENTS

Figure 1:
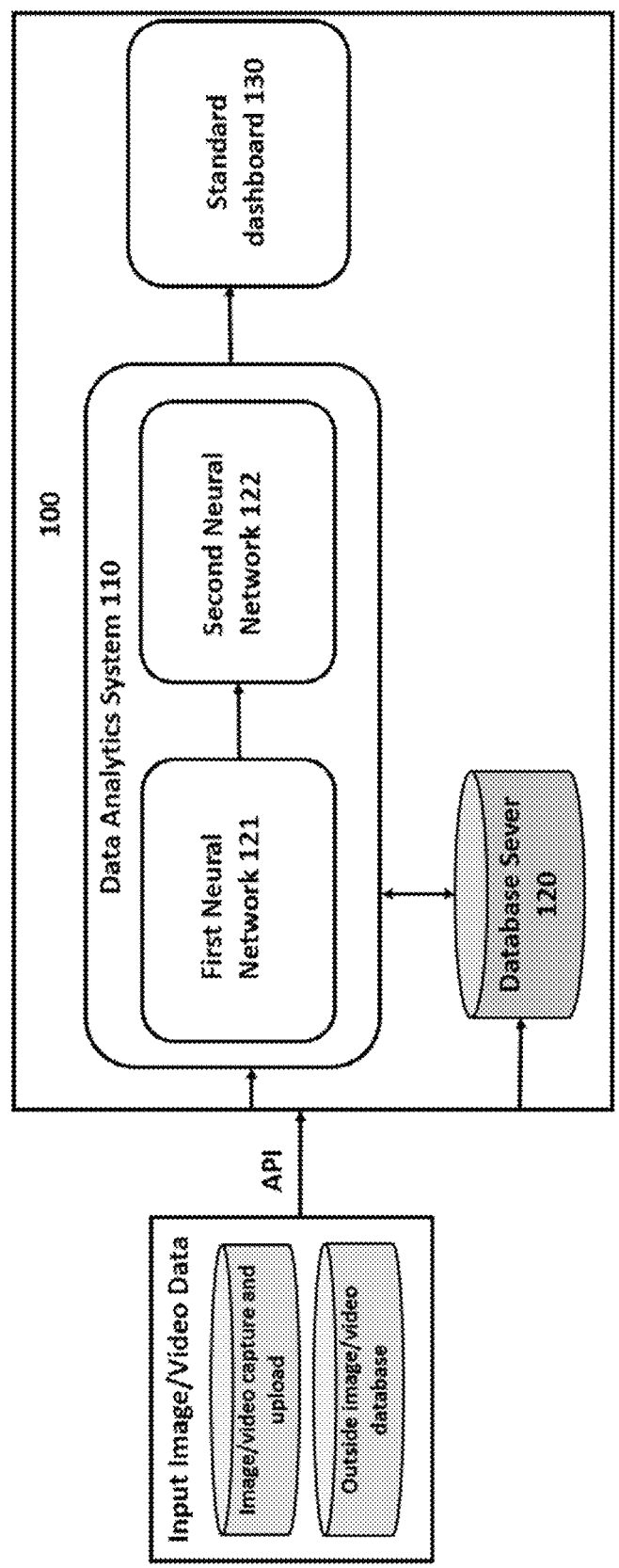
FIG. 1 depicts the components of the system for identifying products in an image or video and outputting product SKUs.

It should be understood that this invention is not limited to the particular methodology, protocols, and systems, etc., described herein and as such may vary. The terminology used herein is for the purpose of describing particular embodiments only and is not intended to limit the scope of the present invention, which is defined solely by the claims.

As used in the specification and appended claims, unless specified to the contrary, the following terms have the meaning indicated below.

"Deep learning" refers to a subfield of machine learning concerned with algorithms inspired by the structure and function of the brain called artificial neural networks.

"Convolutional neural network (CNN)" a class of deep neural networks, most commonly applied to analysing visual imagery. They are also known as shift invariant or space invariant artificial neural networks (SIANN), based on their shared-weights architecture and translation invariance characteristics. They have applications in image and video recognition, recommender systems, image classification, medical image analysis, and natural language processing.

"Recurrent neural network (RNN)" is a class of artificial neural networks where connections between nodes form a directed graph along a temporal sequence. This allows it to exhibit temporal dynamic behaviour. Unlike feedforward neural networks, RNNs can use their internal state (memory) to process sequences of inputs. This makes them applicable to tasks such as unsegmented, connected handwriting recognition or speech recognition.

"Artificial neural networks (ANN)" or connectionist systems are computing systems vaguely inspired by the biological neural networks that constitute animal brains. Such systems "learn" to perform tasks by considering examples, generally without being programmed with task-specific rules. For example, in image recognition, they might learn to identify images that contain cats by analysing example images that have been manually labelled as "cat" or "no cat" and using the results to identify cats in other images. They do this without any prior knowledge of cats, for example, that they have fur, tails, whiskers and cat-like faces. Instead, they automatically generate identifying characteristics from the examples that they process.

A "multilayer perceptron (MLP)" is a class of feedforward artificial neural network (ANN). The term MLP is used ambiguously, sometimes loosely to refer to any feedforward ANN, sometimes strictly to refer to networks composed of multiple layers of perceptrons (with threshold activation). Multilayer perceptrons are sometimes colloquially referred to as "vanilla" neural networks, especially when they have a single hidden layer.

"Unsupervised machine learning (ML)" refers to unsupervised machine learning algorithms that gather patterns from a dataset without reference to known, or labelled outcomes.

"Upsample" refers to any technique that usamples image to a higher resolution.

"Application programming interface (API)" is an interface or communication protocol between different parts of a computer program intended to simplify the implementation and maintenance of software.

"Decision-tree" is a decision support tool that uses a tree-like model of decisions and their possible consequences, including chance event outcomes, resource costs, and utility. It is one way to display an algorithm that only contains conditional control statements.

"Microservice" are a software development technique—a variant of the service-oriented architecture (SOA) structural style—that arranges an application as a collection of loosely coupled services. In a microservices architecture, services are fine-grained and the protocols are lightweight.

"Support-vector machines (SVM)" are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on the side of the gap on which they fall.

"Pseudo labels" are automatically generated labels based on data attributes for pretext tasks.

"Pretext tasks" are pre-designed tasks for networks to solve, and visual features are learned by learning objective functions of pretext tasks.

"Downstream tasks" are computer vision applications that are used to evaluate the quality of features learned by self-supervised learning. These applications can greatly benefit from the pretrained models when training data are scarce. In general, human-annotated labels are needed to solve the downstream tasks. However, in some applications, the downstream task can be the same as the pretext task without using any human-annotated labels.

"Self-supervised Learning" is a subset of unsupervised learning methods. Self-supervised learning refers to learning methods in which ConvNets are explicitly trained with automatically generated labels.

"Residual neural network (ResNet)" is an artificial neural network (ANN) of a kind that builds on constructs known from pyramidal cells in the cerebral cortex. Residual neural networks do this by utilizing skip connections, or shortcuts to jump over some layers.

"AlexNet" is the name of a convolutional neural network (CNN), designed by Alex Krizhevsky. The architecture consists of eight layers: five convolutional layers and three fully-connected layers.

"VGGNet" is invented by Visual Geometry Group (by Oxford University). It makes the improvement over AlexNet by replacing large kernel-sized filters (11 and 5 in the first and second convolutional layer, respectively) with multiple 3×3 kernel-sized filters one after another.

"Inception Network" is a type of convolutional neural network classifiers.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

FIG. 1 depicts an exemplary system for identifying products in an image and outputting product SKUs. The system 100 comprises three main components: a data analytics system 110, a database server 120, and a standard dashboard 130. The database server 120 contains real-time inventory images as well as historical images of each product type. The data analytics system 110 is executed by a computer processor configured to apply deep learning algorithms to detect product information captured by the image. The standard dashboard is configured to output a report regarding the product information. The present system may apply to video data following a similar architecture.

The present invention uses microservice API infrastructure to allow real time data processing. In a microservice environment, a real time API proxy makes it easy to listen for instant updates from other micro services without the need for a centralized message broker. Each microservice gets its own proxy instance, and microservices communicate with each other via an organization's own API contracts rather than a vendor-specific mechanism.

Data analytics system 110, database server 120, and standard dashboard 130 may be any type of computer device, including but not limited to a personal computer, a server computer, a series of server computers, a mini computer, and a mainframe computer, or combinations thereof. Data analytics system 110, database server 120, and standard dashboard 130 may each be a web server (or a series of servers) running a network operating system. database server 120 connects to one or more external data sources, including real-time camera capturing images, through one or more networks, including but not limited to, local-area networks (LANs), wide-area networks (WANs), world wide web (WWW), or any combination thereof.

Data analytics system 110 may comprise two neural networks 121 and 122. The first neural network 121 comprises an object detection module and the second neural network 122 comprises an object classification module. The data analytics system may contain more than two neural networks arranged in a sequence, wherein an output generated by a neural network may be fed into the subsequent neural network.

An object detection module applies generalized instance segmentation for accurate product extraction. Segmentation separates a given image into a foreground (a portion to be extracted) and a background (the remaining portion) by means of digital image processing using a computer. Quick and accurate segmentation is desired for a segmentation process. Current segmentation technique such as Yolov3, and RetinaNet do not cancel the background. In contrast, the instance segmentation algorithms in the present proprietary system extracts the products at individual level and masks the products out with any other information.

In general, the image semantic segmentation is achieved based on convolutional neural networks (CNNs). To this end, the data analytics system 110 is trained using the training data stored in the database server 120 or from outside database. The training data includes a plurality of training images.

Figure 2:
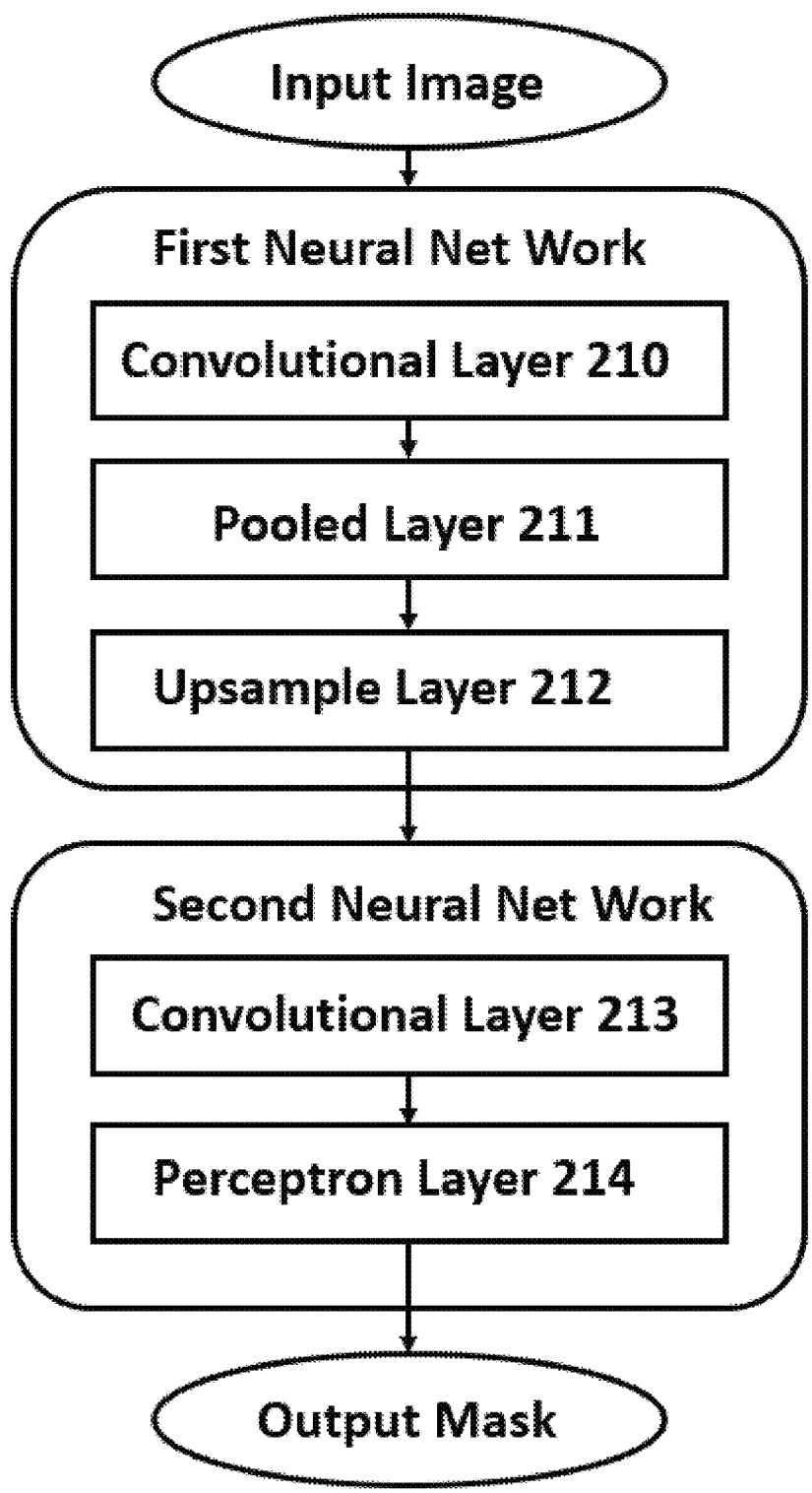
FIG. 2 shows a block diagram of the convolutional neural networks.

FIG. 2 shows a block diagram of the convolutional neural networks in accordance with example implementations of the subject matter described herein. The data analytics system 110 comprises two sequential neural networks. The first neural network extracts the product from the image, highlights or enhance the quality of images to refine results and send it to a second neural network. The first neural network uses a hybrid neural network model that combine convolutional neural network (CNN) and multilayer perceptron (MLP) architecture.

The first neural network comprises a convolutional layer 210 for performing convolution filtering on the input image. As used herein, a "layer" refers to one or more modules or logic for performing specific operations. The convolutional layer 210 includes a plurality of the convolution filters. The convolution filters in the first convolutional layer apply convolution filtering on the input image to be segmented. The results are referred to "convolutional feature maps" or "feature maps." The feature maps record the strength and spatial locations of the responses of the filters on the respective channels. The number of channels is defined by the number of the convolution filters in the convolutional layer.

The feature map of each channel includes activations that record the semantic information for the respective regions in the image. More particularly, the semantic information is indicated by the strength of activations and each activation in the convolutional feature maps is contributed by a receptive field in the image domain.

The convolutional layer 210 further includes a convolutional feature masking (CFM) layer that masks the convolutional feature maps generated by the convolutional layers to produce segment features. The segment features are fed into a segmentation module for image semantic segmentation.

The CFM layer is configured to mask the feature maps. That is, the masking is performed on the convolutional features rather than the raw image. To this end, binary masks are obtained from the segment proposals in the image. As used herein, a segment proposal refers to a candidate segment to be classified for semantic segmentation. Given the input image, a set of candidate segments may be obtained in a variety of ways.

In accordance with implementations of the subject matter described herein, segment features are extracted from the feature maps which are obtained by convoluting the image. More particularly, the binary masks, which are generated from the candidate segments of the image, are used to mask the feature maps instead of the raw image. The resulting segment features will be used in the image semantic segmentation. Because the convolutional features are computed from the unmasked image, their quality is not impacted. In the meantime, the image semantic segmentation can be done efficiently since the convolutional feature maps only need to be computed once. Moreover, the artificial boundaries can be avoided.

Each candidate segment may be presented by a binary mask. The binary mask may the foreground mask and enclosing bounding box. The binary mask is defined by the bounding box of the candidate segment. Within the mask, the values of pixels located inside the candidate segment are set to one, while the values of pixels in the other part are set to zero.

The CFM layer provides the segment features to a segmentation module. The segmentation module is configured to determine a semantic category for each pixel in the image at least in part based on the segment features. The output of the CMF layer may be fed to a classifier in the segmentation module to determine the semantic category to which each pixel in the image belongs.

It is to be understood that the data analytics system 110 can be used in both training and the image segmentation. In training, the parameters and/or coefficients of the convolutional layers 210 can be adapted based on the training data. In addition, or alternatively, the underlying probabilistic distributions of the samples can be modified. In the testing phase, these modules work together to achieve the sematic segmentation of an input image.

The feature maps generated by the convolutional layer 210 are fed into the CFM layer for masking a set of segment proposals or candidate segments. Each of the candidate segments may be represented by a binary mask. The binary masks are also input into the CFM layer. That is, in such implementation, the CFM layer operates on the full-image convolutional feature maps.

In such implementations, the segmentation module includes a pooling layer 211. The pooling layer 211 receives and pools the segment features generated by the CFM layers. As known, the spatial pooling combines the responses of features obtained at nearby locations into some statistic that summarizes the joint distribution of the feature over the region of interests. By means of pooling, the segment features (in terms of its bounding box) are adapted to a fixed-length output. Any suitable pooling technologies, either currently known or to be developed in the future, can be used. By way of example, in one implementation, the pooling layer 211 may apply spatial pyramid pooling (SPP).

The pooled segment features may be fed a upsample layer 212 to perform a backwards convolutional operation to enhance the dimensions of the input to perform a backwards convolutional operation to enhance the dimensions of the input.

The upsample layer 212 is fed into a second convolutional layer 213 in the second neural network. The feature maps produced by the second convolutional layer 213 are provided to a second CFM. It is to be understood that feature maps need to be computed only once, which would be beneficial to the efficiency of the image segmentation.

The output of the second CMF layer may be fed to a multi-head self-supervised learning-based classification module of the second neural network. The multi-head self-supervised learning-based classifier classifies the objects in image according to brands, sub-brands or SKU. The second neural network classifiers enable calculation or processing of quantitative measures of the product.

The output of the second convolutional layer 213 is fed to into a perceptron layer 214. The perceptron layer 214 is suitable for classification prediction problems where inputs are assigned a class or label. The perceptron layer 214 are also suitable for regression prediction problems where a real-valued quantity is predicted given a set of inputs.

Figure 3:
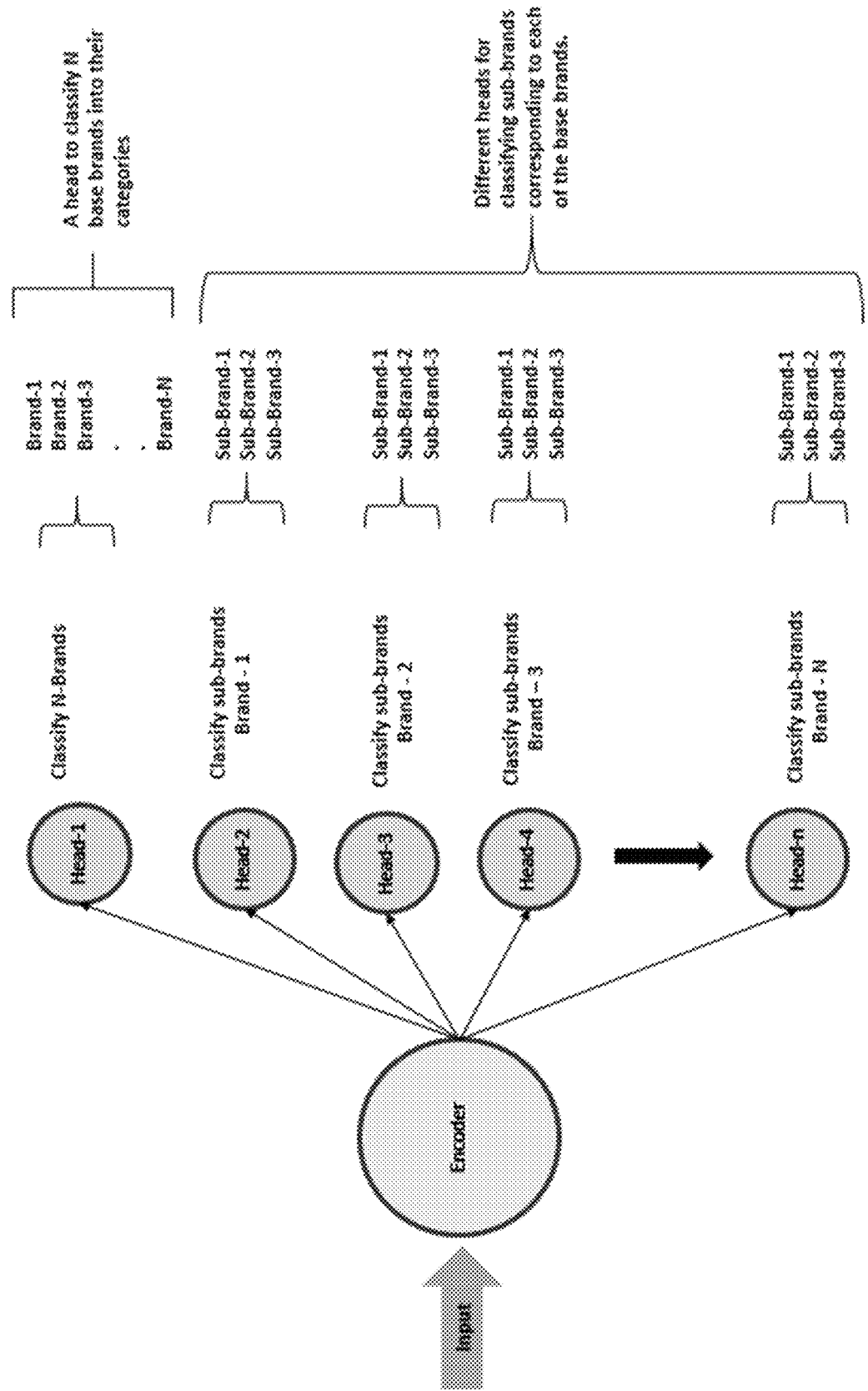
FIG. 3 illustrates an example of multi-head self-supervised learning-based classifier.

FIG. 3 illustrates an exemplary multi-head self-supervised learning-based classifier. The multi-head self-supervised learning-based classifier consists of two main parts: a single base convolutional neural network encoder for extracting features over the whole input image, and multiple projection heads for mapping the features to the space where contrastive loss is applied to perform brands and sub-brands level classification. The single base encoder is trained using self-supervised learning technique and is common for all classification tasks. Different projection heads are small neural networks, such as MLP with one hidden layer. To perform various sub-brands classification, only the head corresponding to their base brand may need to be replaced.

Figure 4:
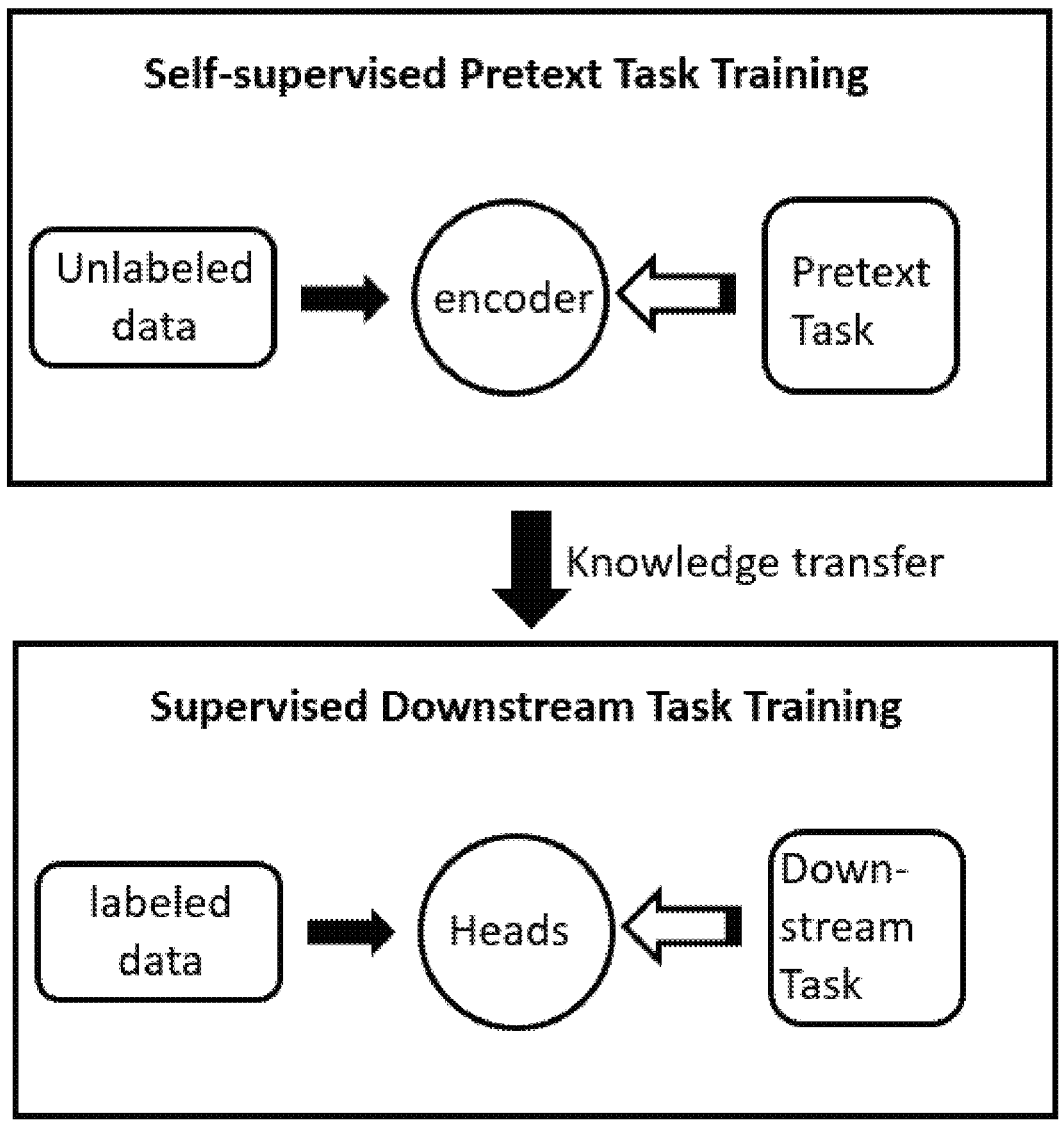
FIG. 4 a self-supervised learning pipeline.

FIG. 4 illustrates a self-supervised learning pipeline. During the self-supervised training phase, a predefined pretext task is designed for the encoder to solve, and the pseudo labels for the pretext task are automatically generated based on some attributes of data. Then the encoder network is trained with a plurality of unlabeled data to learn object functions of the pretext task. After the self-supervised training finished, the learned visual features can be further transferred to different projection heads for downstream tasks as pretrained models to improve performance and overcome overfitting. Generally, shallow layers capture general low-level features like edges, corners, and textures while deeper layers capture task related high-level features. Therefore, visual features from only the first several layers are transferred during the supervised downstream task training phase.

In some embodiments, a pretext task is defined for an encoder network to solve and visual features can be learned through the process of accomplishing this pretext task. The pseudo labels for pretext task can be automatically generated without human annotations. The encoder network is optimized by minimizing the error between the prediction of output and the pseudo labels. The quality of this prediction is then evaluated using a contrastive loss. Contrastive loss takes the output of the encoder network for a positive example and calculates its distance to an example of the same class and contrasts that with the distance to negative examples. The loss is low if positive samples are encoded to similar (closer) representations and negative examples are encoded to different (farther) representations. To adapt contrastive loss to self-supervised learning, the encoder network is pre-trained using contrastive loss to embed samples guided by their labels. Then the encoder weights are frozen so that they are constant. Then a projection head is attached to the encoder output and is trained on labelled data to produce a final representation.

The projection head may be a multilayer perceptron (MLP). Multiple projection heads may be attached to the encoder and are trained for a specific task. Each projection head would not communicate with each other. At least one projection head is trained to classify a base brand into its categories. A plurality of projection heads is trained to classify sub-brands corresponding to each of the base brand. To perform various sub-brand classification, the projection head corresponding to their base brand would be replaced. Once the network is trained, the projection head can be discarded. The encoder network and final representations may be used to learn new downstream tasks. As the projection heads have a smaller number of parameters and are easily replaceable, the present system is much more memory and time efficient.

In some embodiments, context-based pretext tasks have been designed and applied for self-supervised learning. The design of context-based pretext tasks mainly employs the context features of images or videos such as context similarity, spatial structure, temporal structure, etc. In context similarity, pretext tasks are designed based on the context similarity between image patches. This type of methods includes image clustering-based methods and graph constraint-based methods. In spatial context structure, pretext tasks are based on the spatial relations among image patches. This type of methods includes image jigsaw puzzle, context prediction, and geometric transformation recognition, etc. In temporal context structure, the temporal order from videos is used as supervision signal. The encoder is trained to verify whether the input frame sequence in correct order or to recognize the order of the frame sequence.

In some embodiments, the data analytics system can generate a descriptor of the object based on the brand and sub-brand level classification category generated by the classifier. The classification categories and descriptors associated with detected objects can be stored as data structures (e.g., using locality-sensitive hashing (LSH) as part of an index data structure or inverted index) in the database 120 and can be accessed by components of the data analytics system as well as the end user computing device.

A further embodiment provides an object detection module in the first neural network 121 which is configured to detect object(s) and generate a descriptor for the object(s). For example, the object detection module detects a number of objects captured in an image of a retail shelf as boxes and then generates a descriptor "product" for these objects. The object classification component of the second neural network in the data analytics system can determine hierarchical classification categories comprising a first level classification category, for example, shampoo, a type classifier of an object; a second level classification category, for example, Pantene, a brand classifier of the object; and a third level classification category, for example, Pantene Prov-V sub-brand classifier of the object.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

EXAMPLES

1. Application of Graphical Representation of Image Processing Tasks to Hardware Damages Assessment The present invention may be used for identifying hardware damages from real time images. Factories are increasingly looking for fast and effective means to quickly and frequently survey and communicate the condition of running equipment so that essential repairs and maintenance work can be done in a proactive and timely manner before it becomes too dangerous and expensive. Traditional methods for this type of work commonly comprise of engaging factory surveyors to undertake a condition assessment which involves a lengthy site inspection to produce a systematic recording of the physical condition of the equipment elements, including cost estimates of immediate and projected long-term costs of renewal, repair and maintenance of the equipment. Current asset condition assessment procedures are extensively time consuming, laborious, and expensive. This present invention addresses these challenges through an automated detection and localisation of key equipment defects from images.

In phase 1, classifier models for different hardware are built for identification of category of components/hardware present/visible in the image. Classifier models for different subparts of a hardware are built for identification of zones of component/hardware present/visible in the image.

In phase 2, damage presence detector is built for detecting the presence of damage in sub-part of the component visible in an image. Object detection/image segmentation models are built to localize and classify the type of damage on the machinery.

2. Application of Graphical Representation of Image Processing Tasks to Security Surveillance Solution The current age of technology generates a tremendous amount of data very instant throughout the world. Among them, amount of video data generated is having a major share. Education, healthcare, tours and travels, food and culture, geographical exploration, agriculture, safety and security, entertainment etc., are the key areas where a tremendous amount of video data is generated every day. A major share among it are taken by the daily used surveillance data captured from the security purpose camera and are recorded every day. Storage, retrieval, processing, and analysis of such gigantic data require some specific platform. The present invention may be applied to analyze video surveillance data.

The present invention performs root cause analysis to understand people flows that can help pre-empt anomalies and improve efficiencies. The present invention uses statistical machine learning techniques to develop solution framework to analyze employees' behavior flows at various access points to identify anomalous activities. The present invention develops an interactive dashboard that enables tracking by harmonizing multi source data.

In conventional systems, such as conventional neural networks, a user may annotate (e.g., visually identify) the action in a video with a bounding-box. The annotation may be used to train a conventional neural network, or other classifiers, on the video samples. For example, a user may present a sequence of frames of a long jump and may annotate the portions of the frames that correlate to the long jump action. In this example, the conventional neural network uses the annotated action to learn the long jump action. Furthermore, based on the learning, the conventional neural network may identify a long jump action in a new frame sequences presented to the conventional neural network after the training is complete. The new frame sequence refers to a frame sequence that was not used (e.g., seen) during training.

In contrast to conventional systems, aspects of the present disclosure are directed to an attention recurrent neural network (RNN) that generates attention feature maps for each frame of a frame sequence. Each attention feature map of each frame indicates one or more potential actions, moving objects, and/or events. The potential actions, moving objects, and/or events may be referred to as an action proposal. In one configuration, the attention recurrent neural network is trained on action class labels provided for an input frame sequence. That is, the attention recurrent neural network is trained to classify frames based on an identified action. Furthermore, in one configuration, the bounding-boxes are generated from an attention map that captures the action. Although described generally with respect to recurrent neural networks, the present disclosure can employ a particular type of recurrent neural network, such as a long short-term memory (LSTM) network.

A deep learning neural network may be trained with action class labels, Training is performed with multiple video samples for each action class label. "Action localization" may refer to providing (e.g., identifying) the action locations by bounding-boxes and identifying the action class. The locations may be found after temporal smoothing and also after obtaining class labels with the attention recurrent neural network. The temporal smoothing may be applied locally on the bounding-boxes spanning a specific number of consecutive frames within a time period. Additionally, weighted linear regression may be applied over the coordinates of bounding-boxes spanning a set of thirty frames from a sequence of frames. The bounding-box may be provided when the recurrent neural network is trained with an action class label but not necessarily. Additionally, or alternatively, the method (e.g., via the RNN) may provide the bounding-box location if a lexicon of trained networks for various actions is available.

Training outputs generated by the first machine learning tool in response to the training inputs may be clustered into groups or clusters of mutual confusion. For example, where a video is provided as a part of a training set to a first machine learning tool configured to perform an action classification function, each of the labels or categories returned by the first machine learning tool as training outputs, e.g., each of the labels or categories identified by the first machine learning tool as being potentially associated with the video, may be grouped together into a cluster. The cluster may include the label or category actually associated with the action, as well as any other labels or categories with which the action is most commonly confused.

3. Application of Graphical Representation of Image Processing Tasks to Retail Shelf Analytics Using image analytics to monitor the contents and status of retail store shelves is an emerging trend with increasing business importance. Detecting and identifying multiple objects on store shelves involves a number of technical challenges. The particular nature of product package design, the arrangement of products on shelves, and the requirement to operate in unconstrained environments are just a few of the issues that must be addressed.

Figure 5:
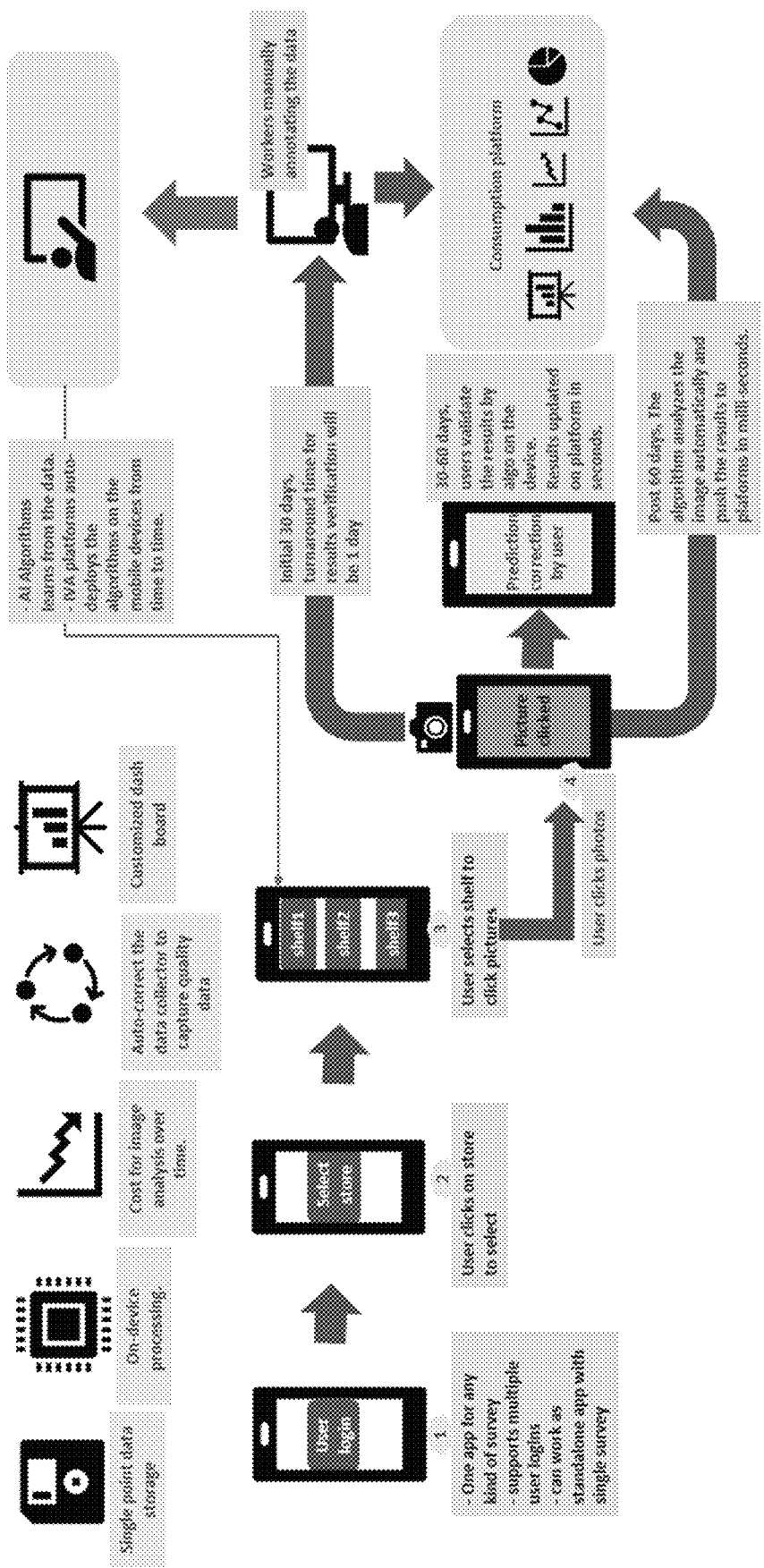
FIG. 5 illustrates an exemplary workflow for retail shelf analytics.
Figure 6:
FIG. 6 illustrates a login interface of a mobile application.
Figure 6:
Figure 6:
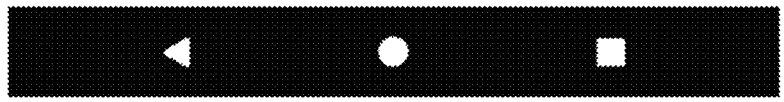
Figure 7:
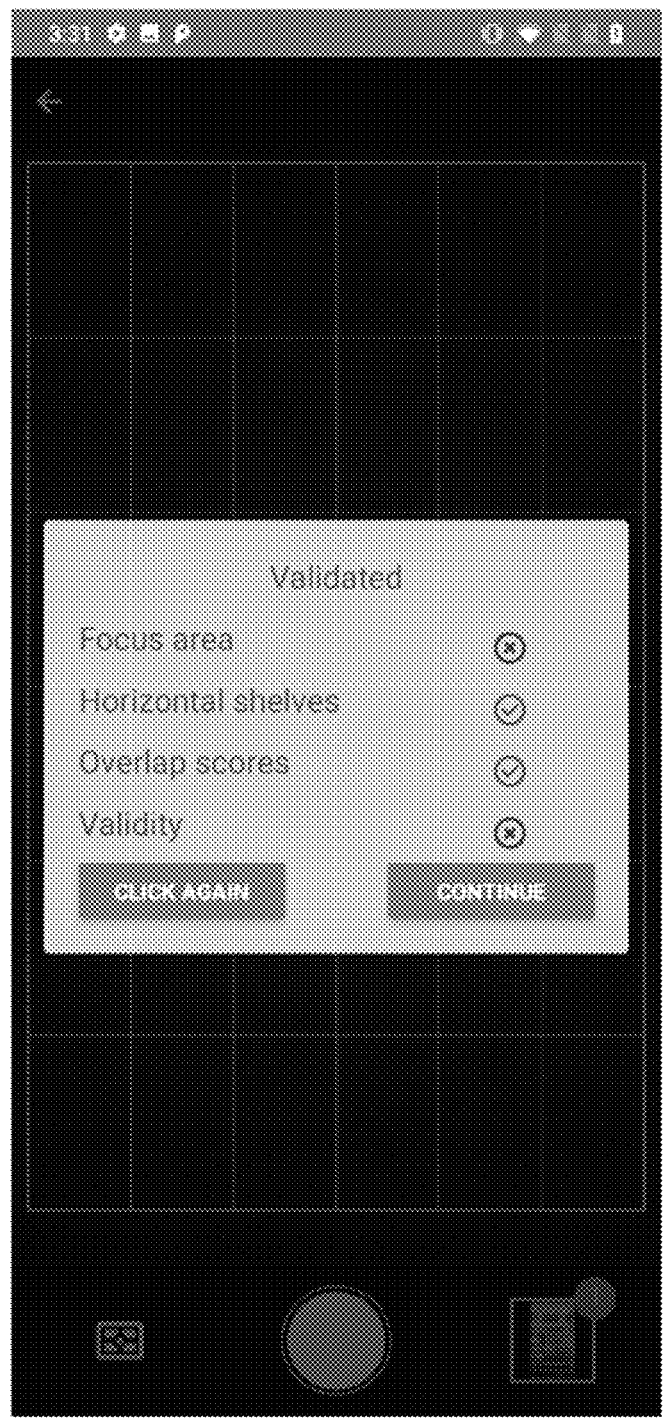
FIG. 7 shows a validation interface of a mobile application.

The present invention addresses these challenges through application of graphical representation of image processing tasks. FIG. 5 illustrates an exemplary workflow for retail shelf analytics. A user may choose to view shelf images through an application in a non-transitory computer-readable medium to take pictures of identified shelfs. The a non-transitory computer-readable medium may comprise a mobile device, a graphic processing unit, an edge device, and the like. The APP enables a user to capture images of shelves from different stores and upload them for processing. As shown in the FIG. 6., user can login to the application using their credentials. Once logged in, user can see the store location in the map view on the application. User can then select the store and the corresponding shelf and as shown in the FIG. 7. User choose to capture and upload the images of shelves. The images may be generated through fixed cameras or robots. Once the images are captured user will be popped up with the results which user can validate and submit for final display on the dashboard.

Figure 8:
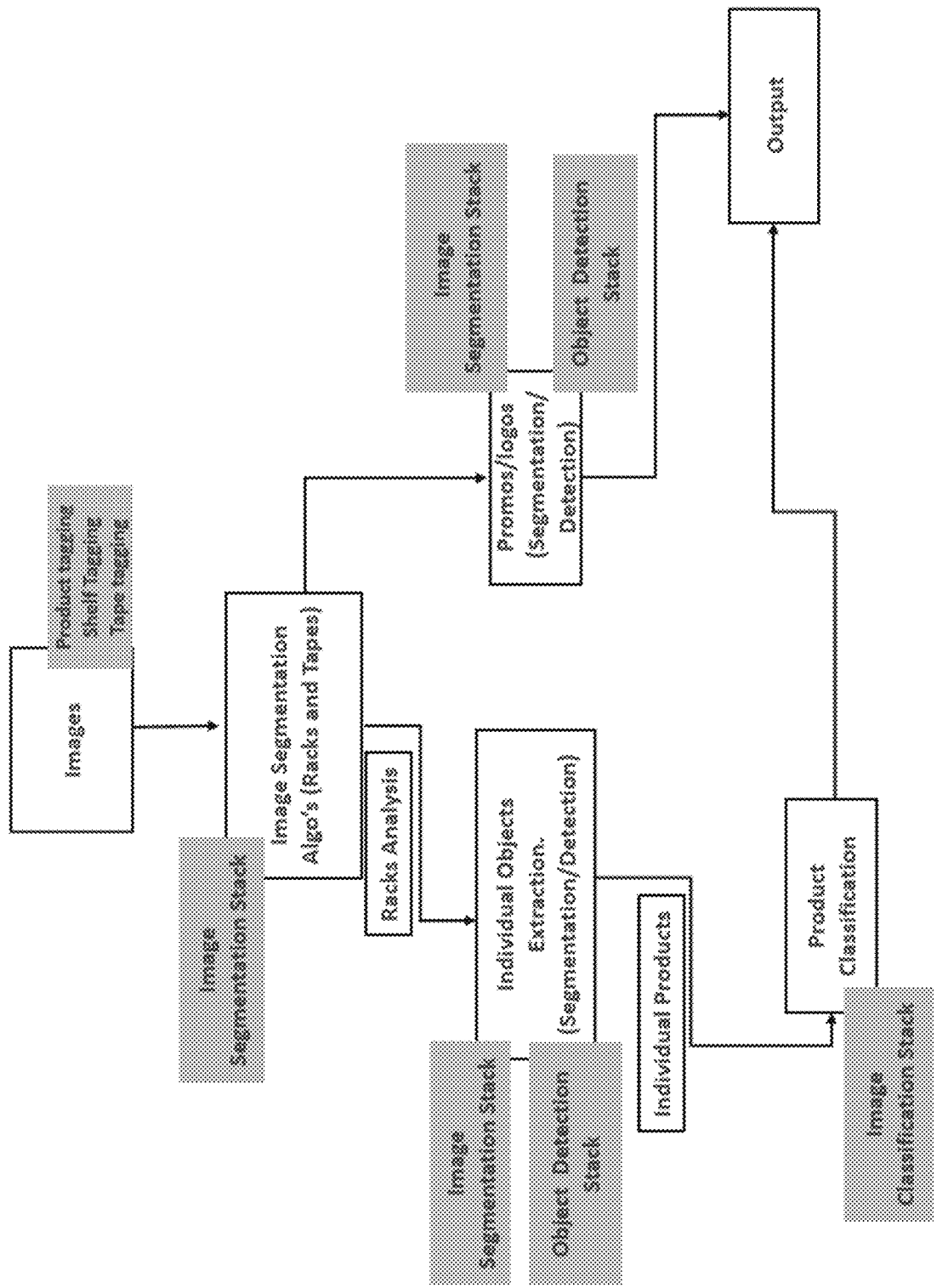
FIG. 8 illustrates the algorithms for object detection and classification.

The images may be sent to the present system for object detection and classification followed the algorithms as illustrated in FIG. 8. For the initial days, pictures clicked by user/staff will be annotated manually and used for training the algorithm until it achieves the expected performance level. These re-trained algorithms can be periodically updated using continuous integration and continuous delivery (CI-CD) capability of Intelligent Video Analytics (IVA) platform which can auto deploy the AI models on the go. The system offers store personnel an instant view of shelf status and a list of action items for restocking shelves. The core of the system is based on its ability to achieve high rates of product recognition.

The invention claimed is:

1. A system for identifying a product in an image and outputting an identifier of a target, comprising:
    a database server executed by one or more storage devices for storing image data comprising real-time inventory images and historical images of each product type;
    a data analytics system comprising one or more convolutional neural networks; and
    a standard dashboard;
    wherein the data analytics system comprises a non-transitory computer-readable medium and instructions that when executed by the non-transitory computer-readable medium cause the non-transitory computer-readable medium to perform operations comprising:
        receiving an input unlabeled image, via application programming interface from a recording device or an external database;
        generating, via an augmentation module of the data analytics system, an augmented unlabeled image;
        training an encoder neural network of the data analytics system with the augmented unlabeled image to extract features and generate an output labeled image;
        training a plurality of projection heads with the output labeled image to map features to a space where contrastive loss is applied and to perform types and sub-types level classification; and
        generating a descriptor of the object based on the types and sub-types level classification; and
    wherein the standard dashboard is configured to output the descriptor of the object.

2. The system of claim 1, wherein the application programming interface is microservice based.

3. The system of claim 1, wherein the data analytics system applies instance segmentation configured to extract a product at individual level and masks the product out with any other information.

4. The system of claim 1, wherein the neural network comprises a hybrid neural network model consisting of convolutional neural network and multilayer perceptron architecture.

5. The system of claim 1, wherein the projection head comprises multilayer perceptron architecture.

6. The system of claim 1, wherein the neural network is trained on self-supervised contrastive loss.

7. The system of claim 1, wherein the encoder weights are frozen after training.

8. The system of claim 1, wherein at least one projection head is trained to classify a base type into its categories.

9. The system of claim 1, wherein a plurality of projection heads is trained to classify sub-types corresponding to each of the base type.

10. The system of claim 1, wherein the identifier of a target comprises a stock keeping unit of the product.

11. A method for identifying a product in an image and outputting an identifier of a target, comprising:
    receiving an input unlabeled image, via application programming interface from a recording device or an external database;
    generating, via an augmentation module of the data analytics system, an augmented unlabeled image;
    training an encoder neural network of the data analytics system with the augmented unlabeled image to extract features and generate an output labeled image;
    training a plurality of projection heads with the output labeled image to map features to a space where contrastive loss is applied and to perform types and sub-types level classification; and
    generating a descriptor of the object based on the types and sub-types level classification; and
    outputting the descriptor of the object, via a standard dashboard.

12. The method of claim 11, wherein the application programming interface is microservice based.

13. The method of claim 11, wherein the data analytics system applies instance segmentation configured to extract a product at individual level and masks the product out with any other information.

14. The method of claim 11, wherein the neural network comprises a hybrid neural network model consisting of convolutional neural network and multilayer perceptron architecture.

15. The method of claim 11, wherein the projection head comprises multilayer perceptron architecture.

16. The method of claim 11, wherein the neural network is trained on self-supervised contrastive loss.

17. The method of claim 11, wherein the encoder weights are frozen after training.

18. The method of claim 11, wherein at least one projection head is trained to classify a base type into its categories.

19. The method of claim 11, wherein a plurality of projection heads is trained to classify sub-types corresponding to each of the base type.

20. The method of claim 11, wherein the identifier of a target comprises a stock keeping unit of the product.

21. The method of claim 11, wherein the method is executed by a non-transitory computer-readable medium, the method further comprising:
    logging in a mobile application by a user on the mobile device using a user credential;

selecting a store location in a map view on the application;
selecting a shelf;
initiating an unload of an image of the selected shelf;
transmitting the image of the selected shelf captured by a remote camera;
receiving the image of the selected shelf at the user mobile device;
validating the image of the selected shelf by the user;
manually annotating the image of the selected shelf;
training the encoder neural network of the data analytics system with the annotated image to extract features and generate an output labeled image;
training the projection heads with the output labeled image to map features to a space where contrastive loss is applied and to perform types and sub-types level classification; and
generating a descriptor of the object based on the types and sub-types level classification; and
outputting the descriptor of the object, via a standard dashboard;
wherein the encoder neural network and the projection heads are periodically updated using continuous integration and continuous delivery (CI-CD) capability of an Intelligent Video Analytics (IVA) platform.

22. The method of claim 21, wherein the non-transitory computer-readable medium comprise a mobile device, a graphic processing unit and an edge device.

* * * * *